April 12, 1938.   E. E. EDENFIELD   2,114,217
CITRUS FRUIT JUICE EXTRACTING MACHINE
Filed Nov. 15, 1935   5 Sheets-Sheet 1
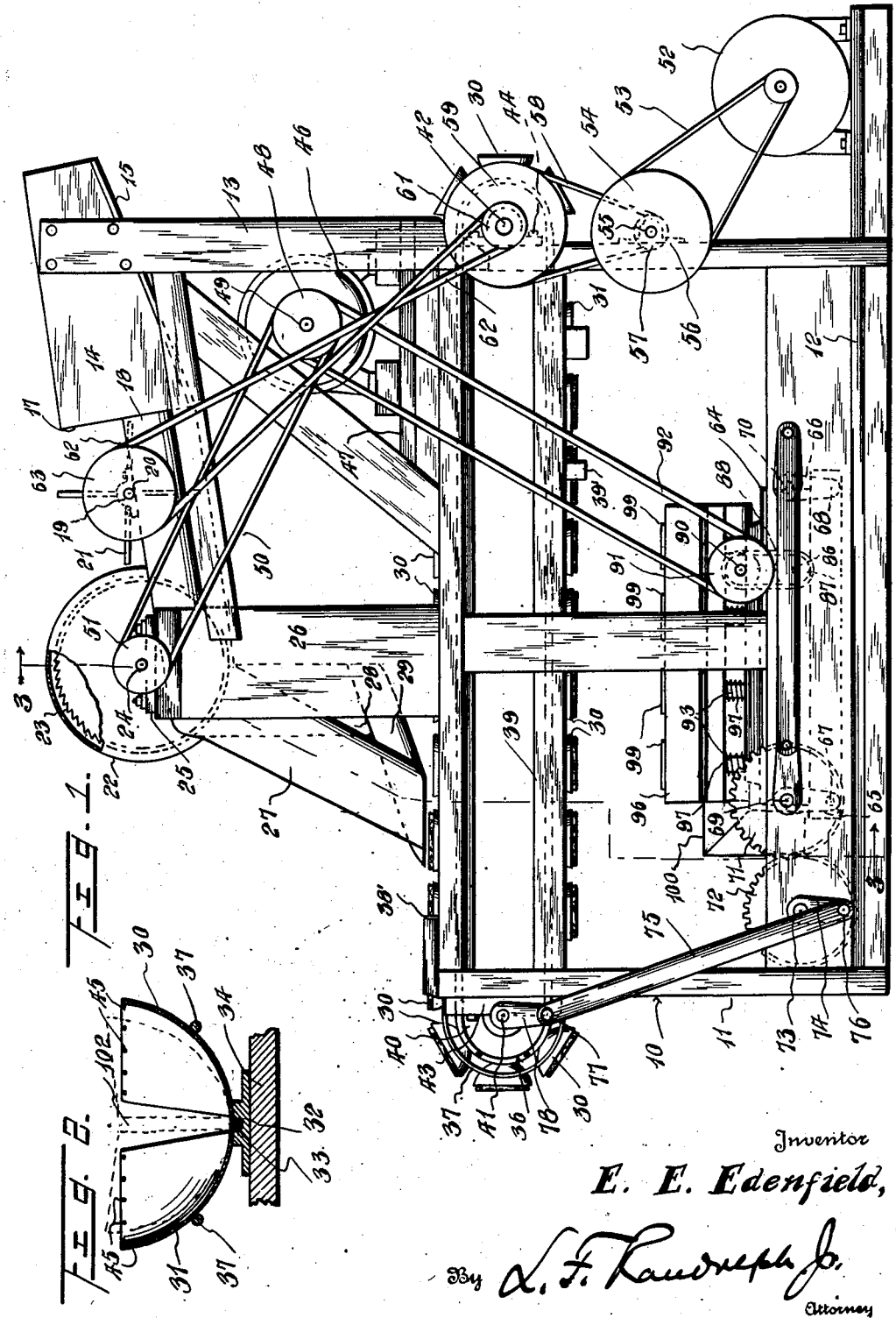
Inventor
E. E. Edenfield,
By L. F. Randolph Jr.
Attorney

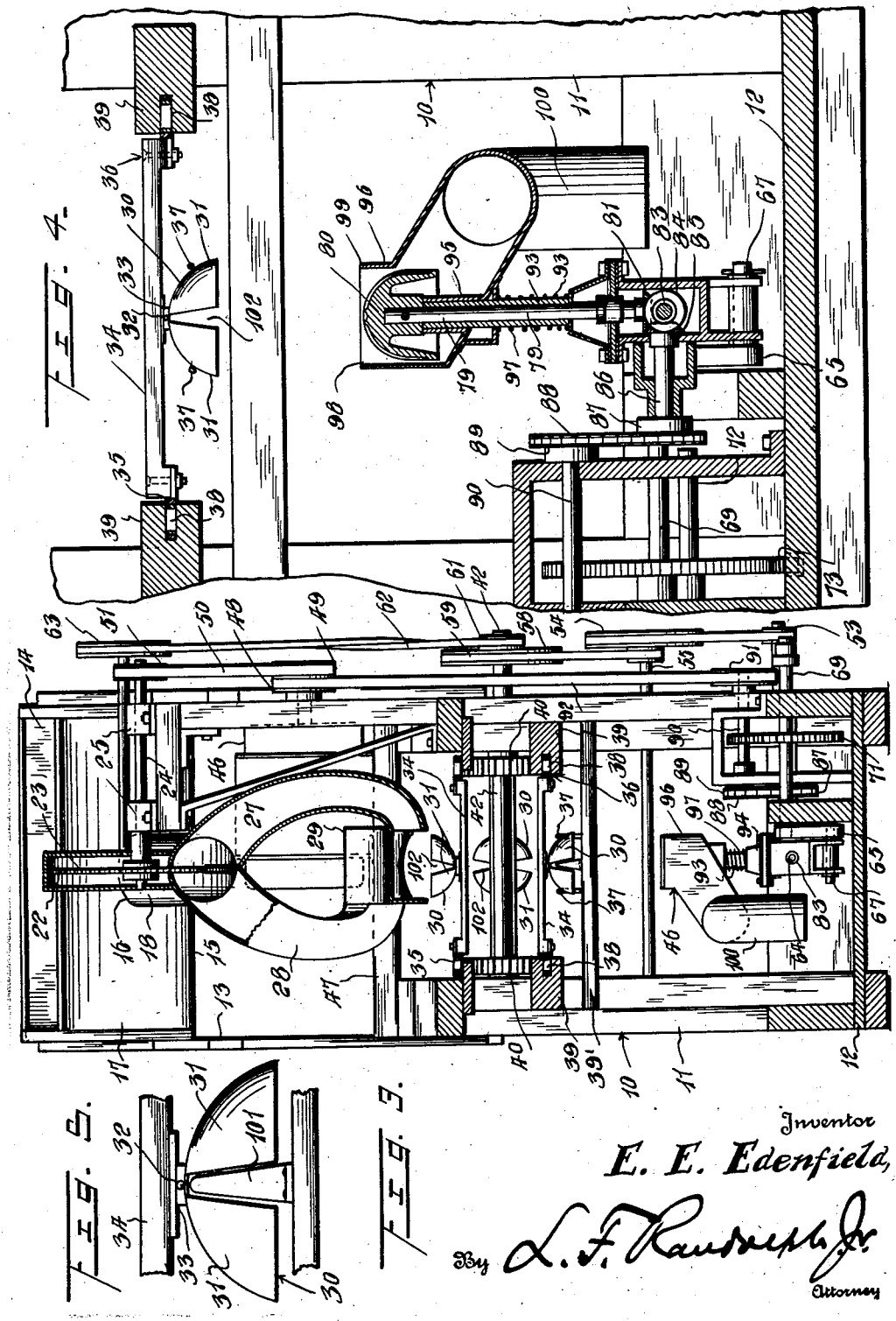

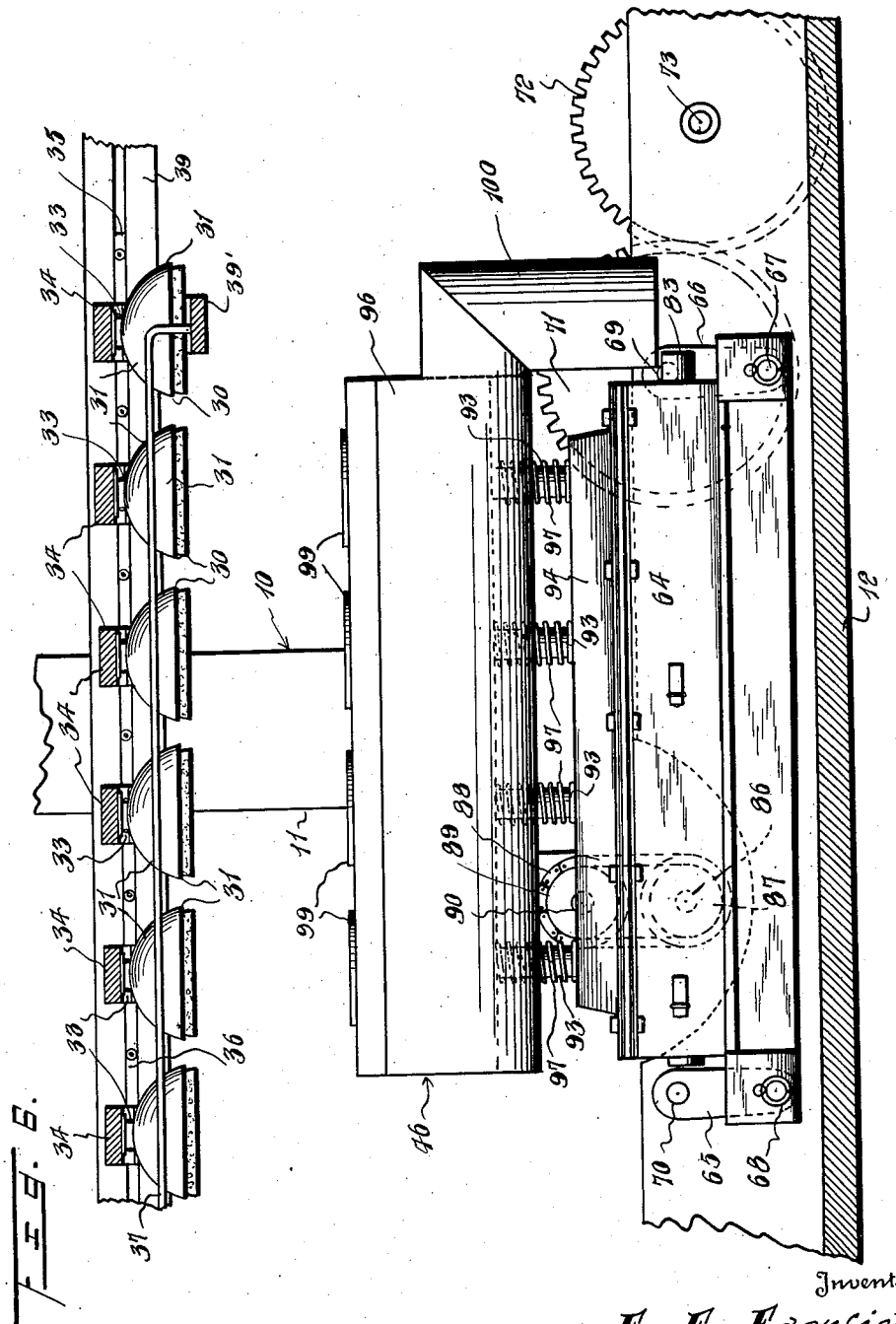

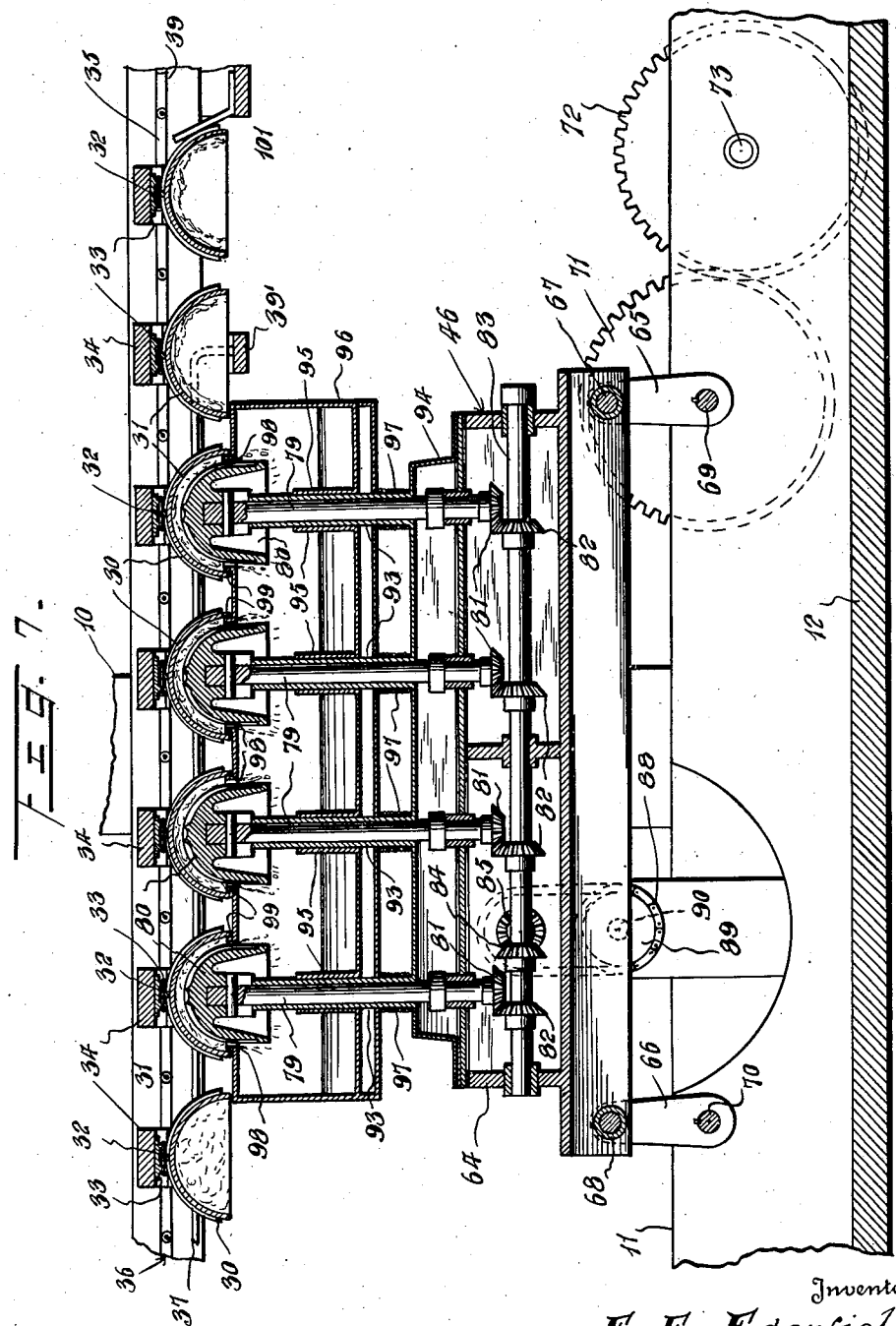

April 12, 1938.  E. E. EDENFIELD  2,114,217
CITRUS FRUIT JUICE EXTRACTING MACHINE
Filed Nov. 15, 1935  5 Sheets-Sheet 5
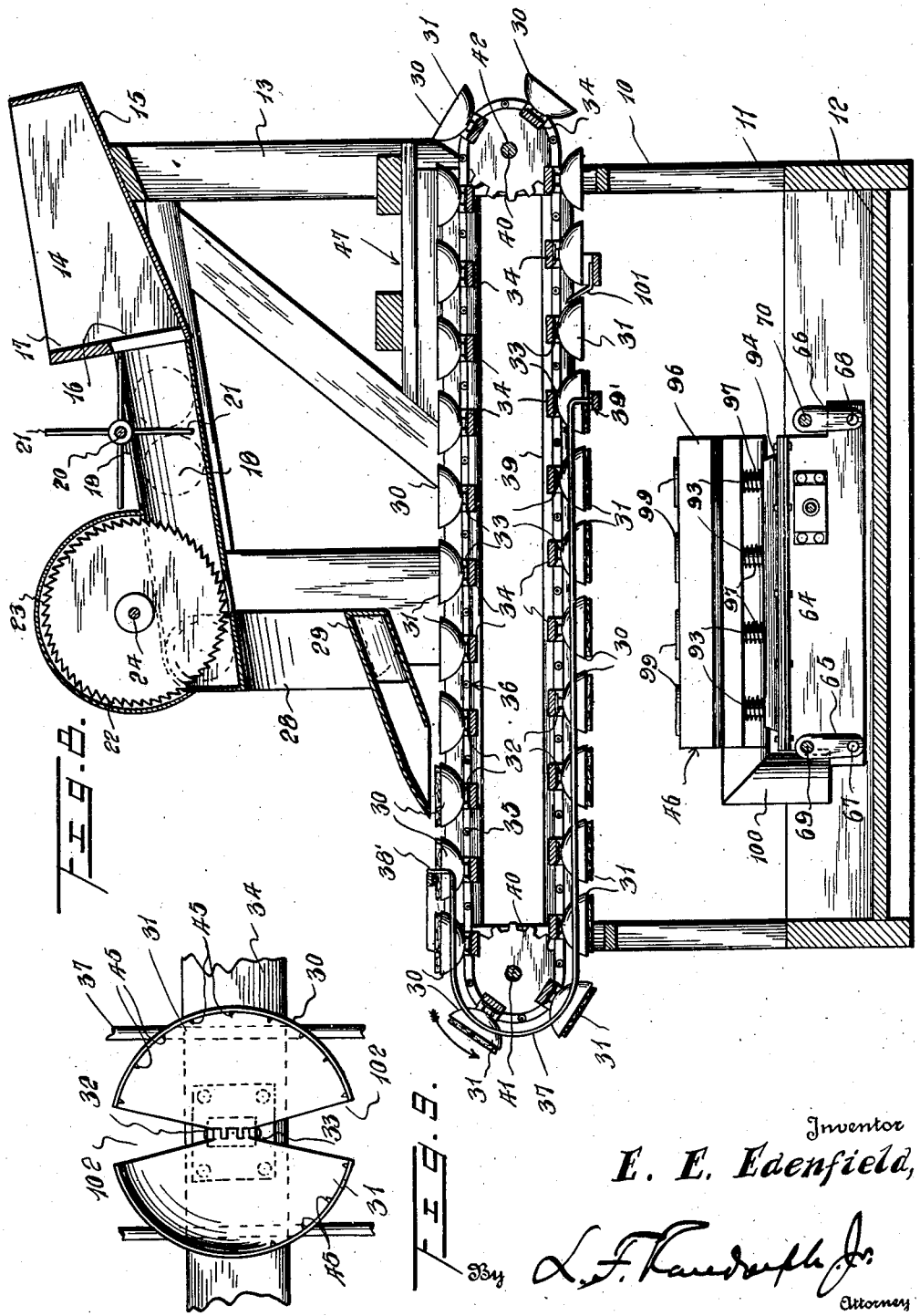
Inventor
E. E. Edenfield,
By [signature]
Attorney Patented Apr. 12, 1938

2,114,217

UNITED STATES PATENT OFFICE 2,114,217

CITRUS FRUIT JUICE EXTRACTING MACHINE

Eli Elwood Edenfield, Lakeland, Fla.

Application November 15, 1935, Serial No. 50,039

17 Claims. (Cl. 146—3)

This invention relates to a machine whereby the juice may be extracted from citrus fruits expeditiously at a minimum cost and automatically following the supply of the fruit to the machine.

It is further aimed to provide a machine of the character set forth wherein the fruit is halved or divided into equal segments, which segments are moved by a conveyor to extracting mechanism, preferably of the reamer type.

Another object is to provide a construction embodying cups having relatively movable parts, which cups are carried by the conveyors, and are adapted to receive the segments of the fruit, and after reception thereof, to be closed and to retain the fruit for the reaming or extracting action, following which the skins are stripped from the cups.

Additionally it is aimed to provide a construction wherein the said cups, after receiving the fruit, are moved into retaining engagement with the fruit.

A still further object is to provide a novel construction of juice extracting and reaming mechanism.

The more specific objects and advantages will in part be pointed out hereinafter and otherwise become apparent from a consideration of the description following taken in connection with accompanying drawings illustrating an operative embodiment.

In said drawings:—

Figure 1 is a view of the machine in side elevation;

Figure 2 is a detail transverse sectional view showing one of the fruit-retaining cups and adjacent parts, as used on the conveyor;

Figure 3 is a vertical transverse sectional view taken substantially on the line 3—3 of Figure 1;

Figure 4 is a fragmentary transverse sectional view through the machine, on an enlarged scale;

Figure 5 is a view of the parts of Figure 5, in the inverted position, and as adjacent the stripper;

Figure 6 is a fragmentary enlarged longitudinal sectional view through the machine, showing the reaming or juice-extracting mechanism in lowered or retracted position;

Figure 7 is a view of the parts of Figure 6, more in sections, and in raised or reaming position;

Figure 8 is a longitudinal sectional view through the machine; and

Figure 9 is a plan view of one of the fruit-retaining cups and an adjacent flap.

Referring specifically to the drawings, wherein like reference characters designate like or similar parts, the machine embodies a skeleton framework generally designated 10, employing, for instance, a lower section 11, having a bottom or base wall 12, and an upper or super-section 13.

Mounted by the super-section 13 is a hopper 14, into which oranges, grapefruit, limes, or other citrus fruit, or any equivalent is placed. Such hopper is preferably open at the top and has a downwardly and forwardly inclined bottom 15, with an exit opening 16 at the lower edge of its front wall 17. Communicating with such opening 16 and supported by the superstructure 13, is a feed trough 18, on which bearings 19 are mounted which journal a transverse shaft 20, having equi-distantly spaced feeder blades 21 thereon which are movable in the trough 18 to regulate the feed of the fruit, one at a time between each pair of blades and in timed sequence. The cross sectional area of the trough 18 is so proportioned relatively to the fruit that there is slight clearance when the fruit passing the feeder blade 21 is engaged by the periphery of a disc cutter 22, the fruit being moved against such cutter through the pressure exerted by the feeder blade 21.

Said cutter or disc knife 22 is centrally disposed longitudinally of the trough 18, and preferably has a saw-toothed edge 23. Such knife or disc cutter is rigid on a shaft 24, journaled in bearings 25, supported on uprights 26 forming part of the aforesaid superstructure 13.

The fruit is so cut or halved by the knife 22 that the halves, immediately after being cut, fall into and through chutes 27 and 28 on opposite sides of the knife, and communicating with the trough 18 at the forward extremity of the latter. One of said chutes has a forward extension 29. The outlets of the chutes are thus disalined transversely so that one of them will deliver a halved fruit into one cup 30, while the other chute delivers the other half of the same fruit into the following or succeeding cup 30. Attention is called to the fact that the internal area of the chutes 27 and 28, as well as the extension 29 are so shaped and proportioned relatively to the halves of the fruit that the line of severance will be uppermost when the fruit is delivered into the cups 30, so that only the skin of the fruit engages and generally conforms to the contour of the cups.

The aforesaid cups 30 each consist of two similar segmentally spherical sections 31 which are hinged together on axes 32 disposed longitudinally of the machine, to brackets 33. Such brackets 33 are suitably fastened to transverse slats 34 fastened to endless flexible runners 35 to thus complete an endless conveyor. Extensions 38 or any suitable anti-friction means may be provided between the conveyor and guide members 39, to insure accurate movement with minimum friction.

When the fruit halves are disposed in the cups 30, their segments 31 are at the maximum distance apart, so that the halves will readily fall thereinto. As the conveyor moves forwardly, such segments 31 are moved toward each other automatically through engagement with closing rods or rails 37. Said rods or rails 37 are generally of U-shape, having one leg longer than the other and fastened as at 38 to the frame portion 11, while the longer legs are fastened as at 39 to another portion of the frame section 11. Said segments 31 have inwardly extending teeth, projections, or spurs, as at 45, which penetrate the skin of the fruit halves, when the sections or segments are moved together by the rods 37, so that the halved fruit will be retained by the cups in inverted position.

Said endless conveyor 36 is trained over pulleys or drums 40 fixed to shafts 41 and 42, journaled in suitable brackets 43 and 44, fastened to the framework portion 11.

The opening and closing movement of the segments 31 constituting cups 30 is best suggested by the whole and dotted lines in Figure 2, the full lines representing the open condition of the cup, and the dotted lines representing the closed and fruit-gripping condition thereof.

As conveyor 36 intermittently advances the fruit toward the location 39, the fruit is reamed or the juice in any other desired manner extracted by reaming or extracting mechanism generally designated 46, and best shown in detail in Figures 4, 6, and 7.

An electric motor 46 is supported on a shelf 47 on the superstructure 13, having a pulley 48 on its driving shaft 49, over which pulley an endless belt 50 is trained, which in turn is also trained over a pulley 51, keyed to shaft 24 in order to rotate the knife 22.

Another electric motor is employed at 52, which drives an endless belt 53 trained over a pulley 54 keyed to a shaft 55 journaled in bearings 56 fastened to frame portion 11, and on which shaft 55 a smaller pulley 57 is keyed which is traversed by an endless belt 58 also traversing a pulley 59 keyed to shaft 42 so as to actuate the latter and thus drive the endless conveyor 36. Such shaft 42 has a smaller pulley 61 keyed thereon over which an endless belt 62 is trained, which further traverses a pulley 63 keyed to shaft 19 in order to drive the feeder blades 21.

Reverting to said reaming or juice-extracting mechanism 46, it comprises a casing or frame 64 oscillatable in a path in parallelism to the runs of the conveyor 36, so as to be movable away from the same, as shown in Figure 6, and into reaming engagement with the fruit halves as shown in Figure 7. To this end, frame 64 has the free ends of cranks 65 and 66 journaled therein as at 67 and 68, such cranks extending rigidly from transverse shafts 69 and 70, journaled transversely to the frame portion 10 in fixed parts thereof. Said shaft 69 has a gear wheel 71 keyed thereto and enmeshed with the teeth of the gear wheel 71 by the teeth of a gear wheel 72 keyed to a shaft 73 journaled in a fixed part of the frame portion 11 and having a crank 74 extending therefrom. Said crank 74 has a link or pitman 75 pivoted thereto at 76 which in turn is pivoted at 77 to a crank 78 keyed to the shaft 41. Thus the operation of the conveyor 36 will be imparted to the link 75, to the gear 72, gear 71, and to the frame or casing 64.

Said frame or casing 64 carries vertical shafts 79 to the upper ends of which reamers or juice extractors 80 of any approved design and material are fastened. Said shafts 79 are suitably supported and journaled in the frame 64 for rotation and against sliding movement relatively thereto. Each shaft 79 at its lower end has a bevel pinion 81 keyed thereto enmeshed with a bevel pinion 82 fixed on a longitudinally extending shaft 83 journaled on the casing or frame 64, such frame or casing preferably being closed about such pinions 81 and 82 and shaft 83, to form a reservoir for a lubricant. Also to prevent the possibility of extracted juice reaching the gearing or bearing parts. A drive pinion 84 is also keyed to shaft 83 and enmeshed therewith is a bevel pinion 85 carried by a shaft 86 journaled on the frame 64 and also having a pulley 87 keyed thereto. Said pulley 87 is traversed by an endless belt 88, which traverses a pulley 89 keyed on a shaft 90, journaled in a fixed part of the machine frame portion 11, and also having a pulley 91 keyed thereto, over which an endless belt 92 is trained in order to drive the shaft 90 and the pulley 48, which said belt 92 also traverses. It will thus be seen that while the axis of the shaft 90 is fixed, the gear 85, shaft 86, and pulley 87 have an orbital movement relatively thereto as they are carried by or moved with the frame or casing 64.

Sleeves 93 extend upwardly from a cover or upper section 94 of the frame or casing 64, and the shafts 79 are journaled therein. Slidable along the sleeves 93, as by means of sleeves or tubes 95, shorter than the sleeves 93 so as to terminate below the upper ends of the latter, is a fruit juice receiver or reservoir 96, which is urged upwardly by expansive coil springs 97 surrounding the tubes 93 and located intermediate the cover section 94 and the reservoir 96.

Said reservoir 96 has openings 98 in its upper wall surrounded by relatively low ribs or flanges 99. The openings 98 are spaced equi-distantly and the same distance as the cups 30, in order to register therewith as shown in Figure 7, in the uppermost position of the fruit reaming or juice-extracting mechanism 46. It will be seen that the springs 97 urge the rims 99 practically into sealing engagement with the fruit within the skin or rind thereof, so that the juice caused to flow by the reamers 80 rotating and extending through the openings 98, will cause the juice to flow down the reamers into the interior of reservoir 96.

Said reservoir 96, as well shown in Figures 4 and 6 in particular, has a discharge chute 100, beneath which a receptacle may be disposed for the collection of the extracted juice, or, if desired, hose may be attached to conduct the juice to any desired destination.

After a reaming or juice-extracting action, and lowering or retraction of the reamers as part of the lowering or retraction of the frame or casing 64, the conveyor further advances, with the cups still retaining the rinds or skins of the halves of the fruit from which the juice has been extracted. Such skins or rinds, after moving past the zone or element 39, will be engaged by a fixed stripper member 101 fastened on a suitable part of the machine frame portion 11, and which stripper member will be straddled by the halves or segments 31 of the cups at the spaces 102 provided therebetween, the segments 31 at this time being out of engagement with the retaining rods 37.

By reason of the fact that the space between the tubes 95 and 93 is relatively close and the former terminates lower than the latter, and the upper ends of the latter are within the reamers, danger of the passage or flow of the juice along bearing parts or to the gearing is avoided.

As a result of the construction described, it will be realized that the parts are operated in such sequence that the fruit travels by gravity one at a time under control of the feeder blades 21 and under the pushing urgency thereof into engagement with the knife 22 which halves the fruit, the segments or halves falling into the respective chutes 27 and 28 and being delivered with their severed faces uppermost into successive cups 30, while the latter are in open position. Travel of the conveyor 36 thereafter causes segments 31 of such cups to close through contact with the rods 37, whereby the projections 45 penetrate the skin or rind of the fruit. This halving of the fruit and advance of the conveyor after successive cups have received the halves, is intermittent and automatic. During such operation, the extracting mechanism is also automatically and intermittently moved into and out of the extracting position of Figure 7. When in the extracting position of Figure 7, the rotation of the reamers effectively extract the juice from the fruit halves so that the latter travels or flows over the reamers into the reservoir 96, and from the same through discharge chute 100 to the receptacle or point of destination. Further intermittent action brings the cups past the zone 39, still retaining the rinds, which are stripped from the cups through abutment with the stripper finger 101, the rinds or skins falling to the floor 12 for removal by a shovel or the like, or falling into a receptacle, if preferred.

Various changes may be resorted to provided they fall within the spirit and scope of the invention.

I claim as my invention:—

1. A machine of the class described, an endless conveyor having cups, a cutter, means to supply fruit to said cutter for separation into segments, a chute on each side of the cutter to receive the segments, said chutes being disposed to discharge all segments simultaneously and each into a different cup arranged successively in the line of advance of the conveyor, and means operable to extract juice from the segments while in said cups after inversion through travel of the conveyor.

2. A machine of the class described, an endless conveyor having cups, a disc cutter, means to supply fruit to said cutter for separation into segments, a chute on each side of the cutter to receive the segments, the fruit being supported at the junction of the chutes, said chutes being of a size permitting the segments to fall therein upon cutting and being disposed to discharge all segments simultaneously and each into a different cup arranged successively in the line of advance of the conveyor, means operable to extract juice from the segments while in said cups after inversion through travel of the conveyor, means operable to insure the feed of the fruit one at a time to the cutter, and said chutes being of a cross sectional area insuring supply of the segments to the cups with the severed portions of the segments uppermost.

3. A machine of the class described, a conveyor having cups, a cutter, means to supply fruit to said cutter for separation into segments, a chute on each side of the cutter to receive the segments, said chutes being disposed to discharge all segments simultaneously and each into a different cup, means operable to extract juice from the segments while in said cups, said cups comprising relatively movable parts normally urged into opened position, and means subject to and operable during the travel of the conveyor to move said parts toward each other to thereby grip and retain the fruit segments therein.

4. A machine of the class described, a conveyor having cups, a cutter, means to supply the fruit to said cutter for separation into segments, a chute on each side of the cutter to receive the segments, said chutes being disposed to discharge all segments simultaneously and each into a different cup, means operable to extract juice from the segments while in said cups, said cups comprising relatively movable parts normally urged to open position, means engageable through and operable by the travel of the conveyor to move said parts toward each other to thereby grip and retain the fruit segments therein, said parts being hinged together, and having fruit-engaging spurs therein.

5. A machine of the class described, a conveyor having cups, a cutter, means to supply fruit to said cutter for separation into segments, a chute on each side of the cutter to receive the segments, said chutes at their junction supporting the fruit for cutting and being disposed to discharge all segments simultaneously and each into a different cup arranged successively in the line of advance of the conveyor, means operable to extract juice from the segments while in said cups and after inversion through movement of the conveyor, said cups comprising relatively movable parts normally urged to open position, means engaged through and operable by the travel of the conveyor to move said parts toward each other to thereby grip and retain the fruit segments therein, said parts being hinged together and being substantially spherical, and the last-mentioned means comprising rods, and means beyond the rods operable after the extracting operation, to strip the skins from the cups.

6. A machine of the class described, a conveyor having cups, a cutter, means to supply fruit to said cutter for separation into segments, a chute on each side of the cutter to receive the segments, said chutes at their junction supporting the fruit for cutting and being disposed to discharge all segments simultaneously and each into a different cup arranged successively in the line of advance of the conveyor, means operable to extract juice from the segments while in said cups and after inversion through movement of the conveyor, said cups comprising relatively movable parts normally urged to open position, means engaged through and operable by the travel of the conveyor to move said parts toward each other to thereby grip and retain the fruit segments therein, said parts being hinged together and being substantially spherical, the last-mentioned means comprising rods, means beyond the rods operable after the extracting operation, to strip the skins from the cups, the parts of the cups being separable along a line longitudinally of the conveyor, and the last-mentioned means being a fixed element disposed in said line and adapted to be straddled by said parts.

7. A machine of the class described, an endless conveyor having cups, a cutter, means to supply fruit to said cutter for separation into segments, a chute on each side of the cutter to receive the segments, said chutes at their junction supporting the fruit for cutting and being disposed to discharge all segments simultaneously and each into a different cup arranged successively in the line of advance of the conveyor, and means to extract juice from the segments while in said cups and inverted through travel of the conveyor operable automatically during the travel of the conveyor.

8. A machine of the class described, an endless conveyor having cups, a cutter, means to supply fruit to said cutter for separation into segments, a chute on each side of the cutter to receive the segments, said chutes at their junction supporting the fruit for cutting and being disposed to discharge all segments simultaneously and each into a different cup arranged successively in the line of advance of the conveyor, and means to extract juice from the segments while in said cups and inverted through travel of the conveyor, the last-mentioned means comprising a frame, means operable to move the frame toward and from adjacent cups, and reaming elements carried by said frame, and means to operate said reaming element.

9. A machine of the class described, an endless conveyor having cups, a cutter, means to supply fruit to said cutter for separation into segments, a chute on each side of the cutter to receive the segments, said chutes at their junction supporting the fruit for cutting and being disposed to discharge all segments simultaneously and each into a different cup arranged successively in the line of advance of the conveyor, and means to extract juice from the segments while in said cups and inverted through travel of the conveyor, the last-mentioned means comprising a frame, means operable to move the frame toward and from adjacent cups, reaming element carried by said frame, means to operate said reaming element, comprising shafts, means journaling the shafts, and gearing in driving relation to the shafts.

10. A machine of the class described, cups to hold segments of fruit, a frame, a juice-receiving reservoir carried by the frame, a reamer to engage the fruit to remove the juice, a shaft carrying said reamer, said shaft being journaled in the frame and extending through the reservoir, means operable to rotate the shaft, means operable to move the frame toward and away from said cups, tubes extending from the frame in an upward direction, said reservoir having sleeves slidably mounted on the tubes, said sleeves being shorter than the tubes, said tubes extending to the reamers, and an expansive coil spring means intermediate the reservoir, and said frame in surrounding relation to the tubes.

11. A machine of the class described, comprising a frame, crank means operable to move the frame toward and away from fruit, a shaft disposed longitudinally of said frame, a driving connection, said driving connection having parts movable orbitally, means to drive said shaft from the last-mentioned parts, tubes rising from said frame and upstanding shafts journaled in said tubes, a reservoir having sleeves rising from adjacent the bottom thereof, surrounding said tubes and being shorter than the tubes, springs surrounding said tubes and engaging said frame and said reservoir, said reservoir having openings in the upper surface thereof, and reamers on said vertical shafts operable through said openings.

12. A machine of the class described, comprising a frame, crank means operable to move the frame toward and away from fruit, a shaft disposed longitudinally of said frame, a driving connection, said driving connection having parts movable orbitally, means to drive said shaft from the last-mentioned parts, tubes rising from said frame and upstanding shafts journaled in said tubes, a reservoir having sleeves rising from adjacent the bottom thereof, surrounding said tubes and being shorter than the tubes, springs surrounding said tubes and engaging said frame and said reservoir, said reservoir having openings in the upper surface thereof, reamers on said vertical shafts operable through said openings, a conveyor having cups adapted to contain the fruit to be engaged by the reamers, means to drive said conveyor, and a connection from the conveyor drive to operate said crank means.

13. A machine of the class described, comprising a frame, crank means operable to move the frame toward and away from fruit, a shaft disposed longitudinally of said frame, a driving connection, said driving connection having parts movable orbitally, means to drive said shaft from the last-mentioned parts, tubes rising from said frame and upstanding shafts journaled in said tubes, a reservoir having sleeves rising from adjacent the bottom thereof, surrounding said tubes and being shorter than the tubes, springs surrounding said tubes and engaging said frame and said reservoir, said reservoir having openings in the upper surface thereof, reamers on said vertical shafts operable through said openings, a conveyor having cups adapted to contain the fruit to be engaged by the reamers, means to drive said conveyor, a connection from the conveyor drive to operate said crank means, comprising a crank on a shaft of the conveyor, link means extending from the crank, a gear wheel driven by the link means, and a gear wheel enmeshed therewith driving said crank means.

14. A machine of the class described having means to hold segments of fruit with their cut surface lowermost, a frame, a juice-receiving reservoir, reamer means to engage the fruit to remove the juice, shaft means carrying said reamer means at the top thereof, said shaft means being journaled in the frame and the reservoir being slidable thereon, means operable to rotate the shaft means, means operable to swing the frame toward and away from said first means, and means to slide said reservoir on and relatively to said shaft means to engage the reservoir with the first mentioned means substantially against leakage.

15. A machine of the class described having means to hold segments of fruit with their cut surface lowermost, a frame, a juice-receiving reservoir, reamer means to engage the fruit to remove the juice, shaft means carrying said reamer means at the top thereof, said shaft means being journaled in the frame and the reservoir being slidable thereon, means operable to rotate the shaft means, means operable to move the frame toward and away from said first means, means to slide said reservoir on and relatively to said shaft means to engage the reservoir with the first mentioned means substantially against leakage, said means operable to move the frame having cranks pivoted to the frame, and an orbitally movable drive connection for said shafts.

16. A machine of the class described having means to hold segments of fruit with their cut surface lowermost, a frame, a juice-receiving reservoir, reamer means to engage the fruit to remove the juice, shaft means carrying said reamer means at the top thereof, said shaft means being journaled in the frame and the reservoir being slidable thereon, means operable to rotate the shaft means, means operable to swing the frame toward and away from said first means, and spring means to slide said reservoir on and relatively to said shaft means to engage the reservoir with the first mentioned means substantially against leakage.

17. A machine of the class described having means to hold segments of fruit with their cut surface lowermost, a frame, a juice-receiving reservoir, reamer means to engage the fruit to remove the juice, shaft means carrying said reamer means at the top thereof, said shaft means being journaled in the frame and the reservoir being slidable thereon, means operable to rotate the shaft means, means operable to swing the frame toward and away from said first means, means to slide said reservoir on and relatively to said shaft means to engage the reservoir with the first mentioned means substantially against leakage, tubes extending from the frame in an upward direction, said reservoir having sleeves slidably mounted on the tubes, said tubes surrounding the shaft means, and said sleeves being shorter than said tubes.

ELI ELWOOD EDENFIELD.